United States Patent

Hense et al.

[11] Patent Number: 5,157,072
[45] Date of Patent: Oct. 20, 1992

[54] USE OF HARDENABLE CYCLOALIPHATIC DERIVATIVES FOR BOREHOLE-FILLING MASSES

[75] Inventors: Ulrich Hense, Landsberg am Lech; Rudolf Hinterwaldner, Munich; Peter Mauthe, Türkheim, all of Fed. Rep. of Germany

[73] Assignee: Hilti Aktiengesellschaft, Furstentum, Liechtenstein

[21] Appl. No.: 623,239

[22] Filed: Dec. 4, 1990

[30] Foreign Application Priority Data

Dec. 5, 1989 [DE] Fed. Rep. of Germany ....... 3940138

[51] Int. Cl.$^5$ ............... C08L 55/00; C08F 236/00; C08F 218/08; C08F 218/14
[52] U.S. Cl. ............................... 524/553; 526/282; 526/284; 525/445
[58] Field of Search ................. 524/553; 526/282, 284

[56] References Cited

U.S. PATENT DOCUMENTS

| | | | |
|---|---|---|---|
| 3,988,279 | 10/1976 | Klassen | 523/401 |
| 4,071,489 | 1/1978 | Emmons et al. | 523/503 |
| 4,172,951 | 10/1979 | Gruber et al. | 560/84 |
| 4,387,182 | 6/1983 | Friedli et al. | 525/44 |
| 4,416,950 | 11/1983 | Muller et al. | 428/537 |
| 4,460,625 | 7/1984 | Emmons et al. | 427/136 |
| 4,992,511 | 2/1991 | Yamamoto et al. | 525/97 |

*Primary Examiner*—Joseph L. Schofer
*Assistant Examiner*—Wu C. Cheng
*Attorney, Agent, or Firm*—Anderson Kill Olick & Oshinsky

[57] ABSTRACT

Cycloaliphatic compounds, which have one or more ethylenically unsaturated substituents, are disclosed as components of borehole-filling masses, optionally together with other curable components.

19 Claims, No Drawings

USE OF HARDENABLE CYCLOALIPHATIC DERIVATIVES FOR BOREHOLE-FILLING MASSES

As hardenable masses for filling boreholes, mixtures, particularly solutions of unsaturated polyesters with or in low molecular weight, monoethylenically unsaturated monomers with a terminal $H_2C=C<$ group, such as styrene, vinyltoluene, vinyl acetate, $C_1$ to $C_{18}$ alkyl esters of acrylic or methacrylic acid have gained acceptance on a large extent in the last two decades. These monomers, which are capable of copolymerizing with the unsaturated polyester resins, are frequently also referred to as cross linking agents. They are useful reactants for curing compositions for filling boreholes by free radical polymerizations. Nevertheless, they are also afflicted with technical, physiological and toxicological problems, which are not fully compensated for by their high profitability. Consideration must be given, for instance, to such matters as the more stringent legal injunctions relating to industrial hygiene, as for example, in the case of styrene. For the efficient standard reactant, "monostyrene", the carcinogenic effect is being checked at the present time at the request of the Senate Committee for Testing Materials Injurious to Health. Since the MAK[1] has been lowered once again to 22 ppm/$Nm^3$ and the BAT value[2] fixed at 2 g/L, not only industrial hygiene, but also environmental problems arise when monostyrene-containing polyester masses for filling boreholes are processed. These problems are due not only to the odor of the materials.

[1]MAK=maximum concentration at the workplace [2]BAT value=biological material tolerance value Furthermore, there have been advances in quality assurance, particularly in the area of load-bearing, fastening techniques. For these advances, borehole-filling masses are required, which, when the simple and nevertheless reliable methods of processing, which are required, are employed—the processing is not always carried out by experts—meet the requirements of the industrial hygiene and environmental injunctions and, in addition, provide improvements in properties, such as a long shelf life, increased adhesion—even on moist substrates—rapid curing, slight shrinkage, increased pull-out values with relative small coefficients of variation, etc.

It has now been discovered that the use of cycloaliphatic compounds of the general formula A

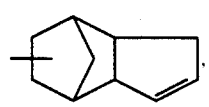

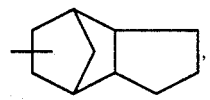

-continued

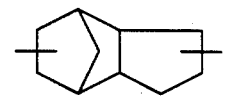

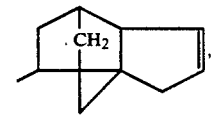

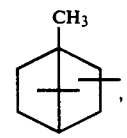

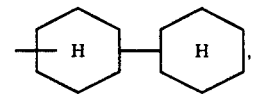

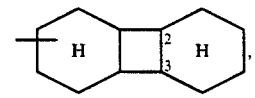

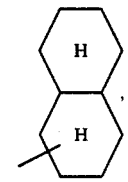

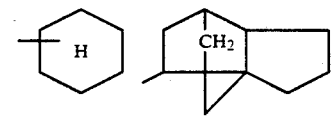

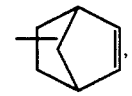

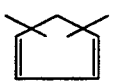

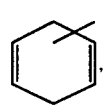

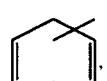

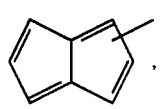

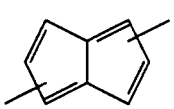

which can be cured by polymerization and are substituted by one or more ethylenically unsaturated groups in or as borehole-filling masses for fastening anchorages in accommodating materials leads to products or fastenings with superior, advantageous properties. In this connection, the ethylenically unsaturated groups, such as the acrylic acid or methacrylic acid groups can be combined with the cycloaliphatic materials directly or over intermediate links, such as divalent, optionally substituted, aliphatic hydrocarbon or polyol groups. The curing or polymerization takes place by means of reaction initiators commonly used for compounds of this type, for example, free radical-forming hardeners, such as peroxy compounds, or also, for example, through high-energy radiation. The borehole-filling masses may contain other components, which are suitable for borehole-filling masses, such as accelerators, stabilizers, viscosity modifiers, fillers, thixotropizing agents and/or other polymerizable compounds, or compounds capable of copolymerizing with the aforementioned, ethylenically unsaturated, substituted cycloaliphatic compounds, particularly polyesters, epoxide acrylates and the like.

Cycloaliphatic compounds of the aforementioned type and their synthesis are already known (for example, German Offenlegungsschriften 28 25 737, 29 31 925, 32 15 932; EP-A1 0 047 120 and EP-A2 0 072 127; U.S. Pat. Nos. 4,097,677, 4,299,761 and 4,400,413). The object of the present invention could, however, not be derived from the usefulness of these compounds as coating materials and lacquers that is described there.

Surprisingly, the compounds, used pursuant to the invention for the borehole-filling masses or for their synthesis, endow these borehole-filling masses with a series of properties or characteristics, which, particularly in their combination, were previously not achievable in borehole-filling masses with the conventional and known compounds. These properties or characteristics include, in particular, the following:

a low viscosity
an extremely low volatility
an extremely high boiling point
a high flash point
a low toxicity
hydrophobicity
a high compatibility with many polymers and resins
a relatively low internal shrinkage, even in the case of homopolymerization
high adhesion at the interfaces after curing
very high hydrolytic stability even under alkaline and acidic conditions The compounds, which are used in the reactive borehole-filling masses, preferably are derivatives of esters of unsaturated carboxylic acids with compounds from the group of the cyclic olefins, such as mono-, di- and polycycloalkenes, the fulvenes, such as triafulvenes, pentafulvenes, heptafulvenes, pentalenes and hydropentalenes and their homologs. These include also the fulvalenes. These compounds are primarily cyclopentadiene, cyclohexadiene and cycloheptadiene derivatives with or without semicyclic double bonds. The norborneness, norbonadienes, decalins, cyclic decanes, terpenes and their homologs, particularly those with cyclopentane rings (in some cases, these are also referred to as iridoids) also belong to this group. Particularly preferred in the new borehole-filling masses is the inventive use of cycloaliphatic compounds of the formula

wherein

A has the meaning given above

R is a hydrocarbon group of an ethylenically unsaturated carboxylic acid, which is optionally substituted by hydroxy, nitrile, halogen and/or $C_1$-$C_4$ alkyl and preferably is an acrylic, methacrylic and/or crotonic acid, X is —O—, —N($R^2$)—, —NH—C(O)— and/or the R—C(O)—X— group represents an ethylenically unsaturated dicarboxylic acid imide group, preferably the maleic acid imide group, $R^1$ is a saturated or unsaturated, at least divalent hydrocarbon group, which is optionally substituted with hydroxy, amino, $C_1$-$C_8$ alkyl, $C_1$-$C_8$ alkoxy and/or oxyalkyl and preferably is an aliphatic hydrocarbon group and optionally has —C(O)—O—, —O—C(O)—O—, —O—C(O)—, —O—, —C(O)—, —NH—C(O)—NH—, —$NR^2$— and/or —NH—C(O)— bridging elements, $R^2$ can be H, R—C(O)—, —$R^1$—A and/or $C_1$-$C_4$ alkyl and n is 1 to 5.

In the compounds of formula (I), R can be a hydrocarbon group, such as methacrylic acid, chloroacrylic acid, cyanoacrylic acid and the like, the acrylic and methacrylic acid groups being particularly preferred.

Especially preferred are compounds in which X is oxygen.

The $R^1$ group contains at least one R—C(O)—X group, wherein R and X can have the above meaning. In the event that there are several R—C(O)—X groups within the one molecule, the R groups and/or the X groups can be the same or different. Bridging elements of the $R^1$ group, which may be present, can be disposed within the $R^1$ group, namely in the case of the aliphatic $R^1$ groups, and/or terminally or on one side or both sides of X or A as bridging groups of the $R^1$ group. In a quite particularly preferred embodiment, $R^1$ is an at least divalent, optionally substituted glycol or polyol group with 2 to 6 carbon atoms, the divalent group of an aliphatic oxycarboxylic acid with 2 to 18 carbon atoms or the divalent group of a carboxylic acid $C_2$-$C_6$ glycol ester or a $C_6$-$C_{80}$ polyalkylene glycol ester. $R^1$ may, for example, also be a $C_1$-$C_4$ alkylene group, which is optionally substituted with lower molecular weight alkyl groups. Preferably, the $R^1$ group is linked over an ether bridging group or an ester group with the A group. In a further group, which can be used and is well suitable, the cycloaliphatic, ethylenically unsaturated, substituted compounds have the following general formula $$(R-X)_nR^1-A \qquad (II)$$

wherein R is an allyl or vinyl group and X, $R^1$, A and n can have the above meanings.

Particularly preferred is the use of compounds of the formula (I), in which —X—$R^1$— can be

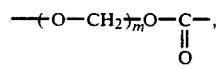

as well as groups of the general formulas

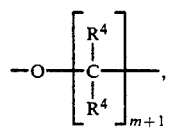

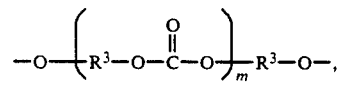

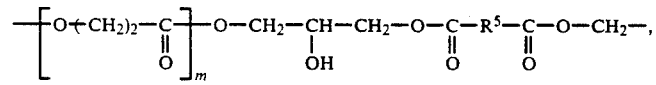

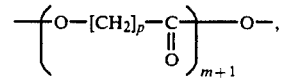

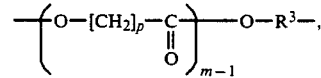

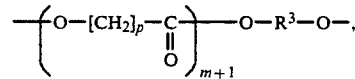

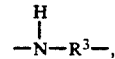

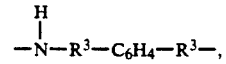

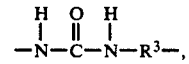

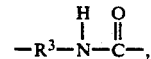

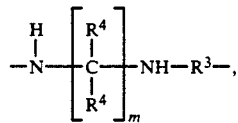

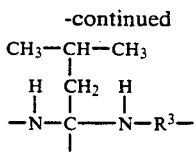

$R^3$ are the same or different and can be branched and unbranched as well as cyclic alkylene groups with 1 to 50 and preferably 1 to 20 carbon atoms, arylene groups, aralkylene groups and/or acyl groups with 1 to 20 carbon atoms, $R^4$ is, H, Cl, CN, OH, $C_1$-$C_4$ alkyl, $R^5$ is —CH=CH—, —CH$_2$—CH$_2$,

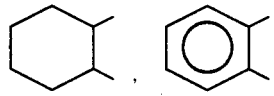

m is 0 to 50 and
p is 1 to 20.

In a further preferred group, the compounds have the formulas

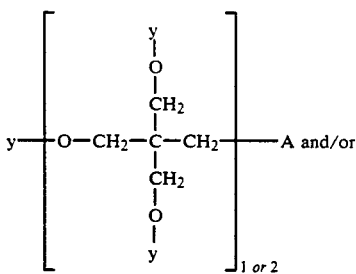

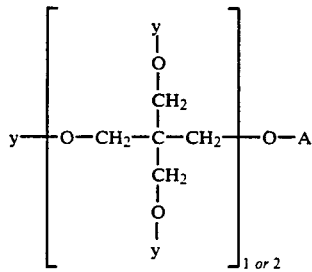

wherein y is R—CO— and/or A, with the proviso that at least one of the y groups is R—CO— and A and R have the above meanings.

Particularly preferred are esters of different unsaturated carboxylic acids, especially acrylic and methacrylic acids, with a glycol monodicyclopentenyl ether of the general formulas:

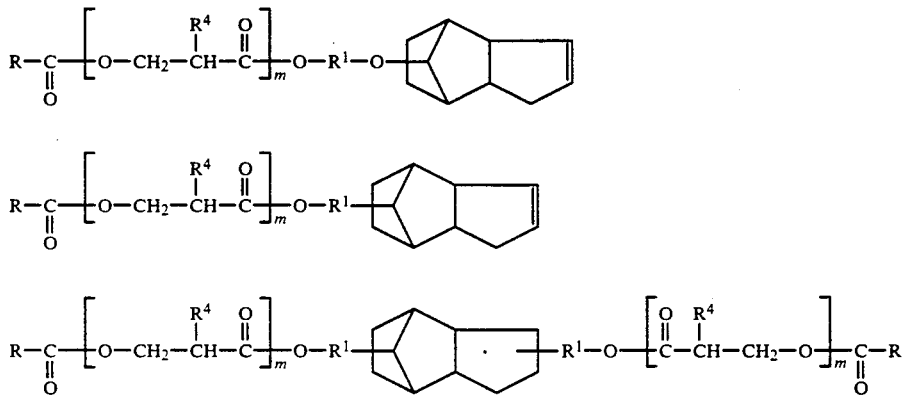

as well as the esters of various unsaturated carboxylic acids, especially acrylic and methacrylic acid, with terpene alcohols of the general formula

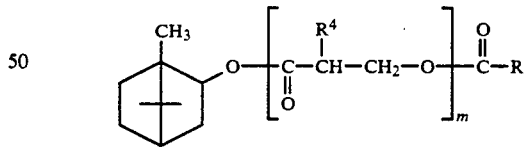

wherein R, $R^1$, $R^4$ and m have the above meanings.

Furthermore, the following have proven their value:
dihydrodicyclopentadienyl esters of unsaturated carboxylic acids, such as esters of acrylic and methacrylic acids dicyclopentenyloxyalkyl esters of unsaturated carboxylic acids, such as esters of acrylic and methacrylic acids bornyl and isobornyl esters of unsaturated carboxylic acids, such as isobornyl methacrylate esters of unsaturated carboxylic acids, such as esters of acrylic and methacrylic acids with tricyclic decane diols containing ether groups and having the following general formula:

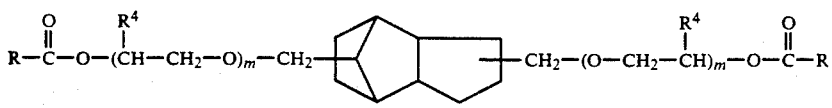

esters of unsaturated carboxylic acids, such as acrylic and methacrylic acids, with tricyclic decanols of the general formula:

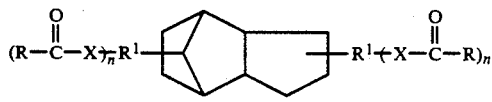

wherein the tricyclo-[5.2.1.0.$^{2,6}$]-decane is disubstituted in the 3,8-, 3,9- or 4,8 position, with an R—CO—X—R$^1$ group, wherein R$^1$ represents

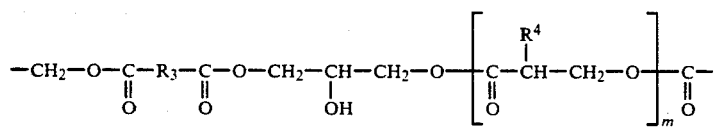

and X, R, R$^1$, R$^3$, R$^4$, n and m in the above formulas have the previously given meanings.

Examples of such compounds are the esters of 3,8-di(hydroxymethyl)-tricyclo-5.2.1.0$^{2,6}$-decane or 3,9-di(hydroxymethyl)-tricyclo-5.2.1.0$^{2,6}$-decane or 4,8-di(hydroxymethyl)-tricyclo-5.2.1.0$^{2,6}$-decane with diacrylic or dimethacrylic acids and esters of unsaturated carboxylic acids, such as acrylic acid, methacrylic acid and crotonic acid, with alpha- or beta-decalol, such as tricyclo-5.2.1.0.$^{2,6}$-decane-8-ol or -9-ol and tricyclo-5.2.1.0.$^{2,6}$-decane-3- or -4-ylmethanol.

Some examples of these are

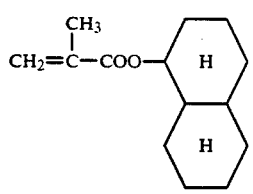

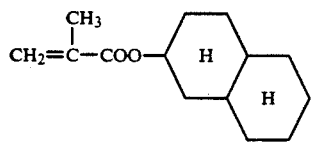

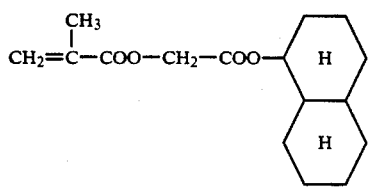

-continued

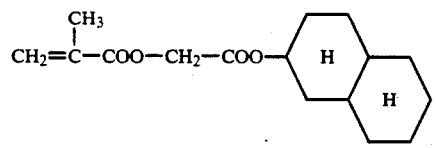

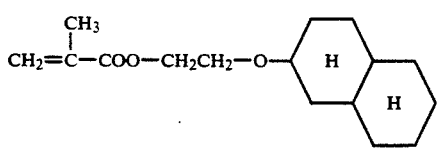

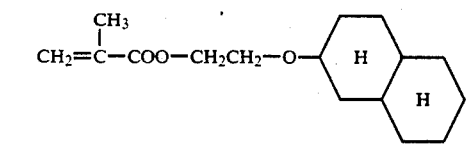

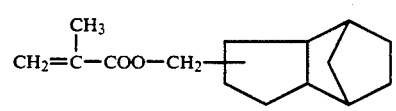

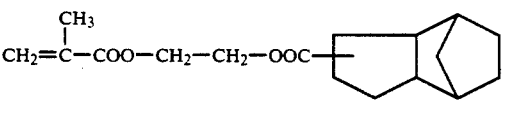

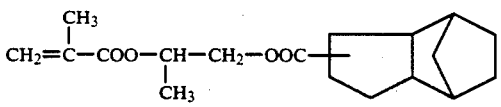

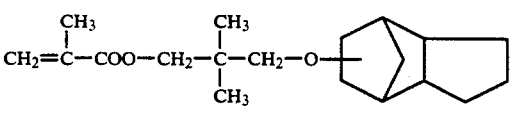

Particularly good results are obtained with cycloaliphatic compounds of the formulas

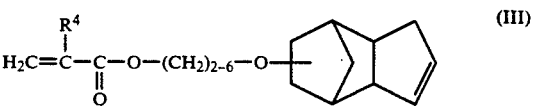

(III)

-continued

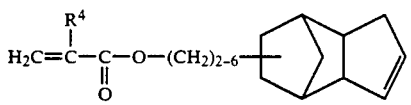  (IV)

wherein R⁴ can have the above meanings.
Compounds of the formulas

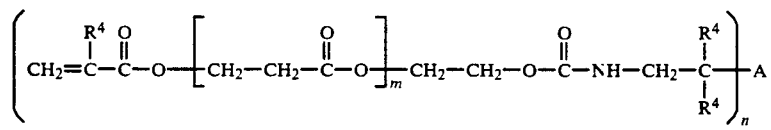

and

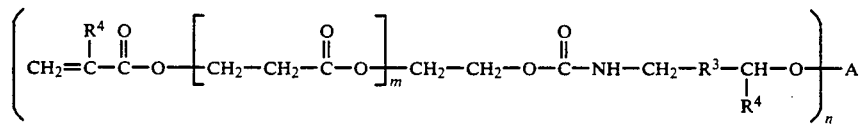

wherein $R^3$ and $R^4$ have the aforementioned meanings, m is 0 to 10 and particularly 0 to 5 and n is 1 to 3 and trinorbornene-ethoxy-trimethylolpropane trimethacrylate, dinorbornene-polyethylene glycol dimethacrylate have also proven to be useful.

Compounds with olefinic, allyl-like unsaturation in the cycloaliphatic system, as shown by some of the above-mentioned compounds, possess dual curing functions, that is, they can be cured by free radical means as well as by autoxidation. This dual reactivity and the extremely high boiling point of the liquid ester-ether monomers, makes them particularly suitable for borehole-filling masses, especially because they endow the borehole-filling masses with properties and characteristics, which could not be attained previously.

Compounds with allyl groups are autoxidizable. If, in a free radical polymerization, for example, the curing agent, such as an organic peroxide, is not mixed homogeneously with the borehole-filling mass containing inventive compounds having allyl groups, the curing of such a composition is not interrupted if metal catalysts, that is, so-called drying agents or siccatives are present. If a layer of such a borehole-filling mass is exposed to the action of atmospheric oxygen, the compound experiences autoxidation at the unsaturated site in the ring with subsequent polymerization of the double bond in the ester group. This last polymerization takes place in spite of the action of molecular oxygen, which normally inhibits such a polymerization. If now a backbone polymer, such as an unsaturated polyester, can bring about an effective autoxidation with the compounds of the invention that carry allyl groups because of their chemical structures, then the use of the monomers of the invention results in a dense cross linking. This evidently presupposes extensive chemical bonding as well as physical mixing between the backbone polymer and the compound containing the allyl groups. The autoxidative action of oxygen with a drying agent takes place also when the backbone polymer shows only a slight tendency to autoxidize or no such tendency at all. The flow of free radicals, produced by the autoxidative action, initiates a subsequent vinyl polymerization of the allyl group-containing compound as well as of the backbone polymer carrying an ethylenically unsaturated group. Because of this dual reactivity of the allyl group-containing compound, the borehole-filling compositions based on backbone polymers with at least one ethylenically unsaturated group provide a high degree of additional functional reliability, particularly because there are many imponderable at the application sites. Since completely anaerobic conditions exist in the fewest of cases in which borehole-filling masses are used, the allyl group-carrying compounds contribute to the setting and curing even in those cases in which the free-radical polymerization initiator is not mixed in homogeneously or has been forgotten completely. This fact provides a relatively high safety coefficient for the fastening technique and represents significant technical progress.

One of the important properties for suitability as a borehole-filling mass is the shrinkage behavior. High shrinkage values, such as those that are observed when conventional borehole-filling masses with monoethylenically unsaturated monomers are cured, cannot be compensated for optimally even by the addition of inert fillers. When fastening an anchor rod in the borehole, the shrinkage that results during curing causes the joint at the interfaces between the borehole wall and the borehole-filling masses to be only interlocking rather than a positive adhesive joint. Consequently, the reliability, when a load is applied, is endangered. These happenings are also responsible for the fact that a relatively very high safety coefficient (3-fold to 4-fold) is prescribed by building regulations when conventional borehole-filling masses are used. The relatively high shrinkage of the known borehole-filling masses is also associated with a high brittleness of the cured borehole-filling compositions. This high brittleness is responsible for the occurrence of dubious critical fastening values under dynamic loading.

Shrinkage is also responsible for the fact that, on interlocking, there is no borehole-filling mass layer, which seals absolutely. Instead, an annular gap is formed between the fastening element and the borehole wall. Accordingly, water, corrosive media and gases can diffuse into the annular gap, which is not tightly closed off, especially at the interfaces, and damage the materials and the hardened borehole-filling mass.

Independently of the above disadvantages, the known borehole-filling compositions are inhibited—at least at the surfaces—by the oxygen of the surrounding air, because they are built up preferably on the basis of systems, which are cured by free radial initiators. Since this oxygen of the air is present in porous materials in the bottom and in the walls of the boreholes, inhibitions of the curing reactions are also observed beyond the interfacial region. If the curing reaction is inhibited, the borehole-filling mass is not hardened thoroughly; it remains soft and "tacky" and is responsible for a pronounced weakening of bond strength. Such borehole-filling mass residues, which are not thoroughly cured, can also additionally contaminate the environment and must be disposed of as hazardous waste.

A further disadvantage of conventional monomers (cross linking agents) in borehole-filling masses is the low flash point, which requires them to be classified as "combustible"; monostyrene, for example, has a flash point of +30° C. and upper and lower explosion points of +60.8° and +29.1° C. respectively. However, the very low evaporation number of 19.5 (DIN 53 170), the strongly irritating odor and the low MAK (=maximum concentration in the workplace) of monostyrene are negative industrial hygiene and environmental factors, which provide an additional reason for eliminating the causes of these and other disadvantages, when the borehole-filling compositions are used in residential areas.

The borehole-filling compositions, obtainable according to the inventive use, can be built up on an inorganic, organometallic and/or organic basis. The unusual properties are fully protected even in combination with backbone polymers and other conventional additives. The borehole-filling compositions can exist in liquid, pasty, thixotropic, semisolid and/or solid form. Suitable as inorganic monomeric, oligomeric or polymeric compounds are, inter alia, hydraulically setting masses, cements, such as Porland cement, alumina melt cement, plaster, anhydrite, magnesite, lime, silicates such as water glass, and also mineral inert materials such as quartz sand, kaolin, etc. The organometallic systems include organosilicon and/or organotitanium compounds, such as vinylsiloxanes and vinylalkyl titanates. Suitable for reactive borehole-filling masses based on organic monomers, oligomers and/or polymers, are compounds, which can undergo vinyl polyaddition and polymerization reactions, as well as autoxidative cross linking. These include unsaturated monomeric, oligomeric and polymeric compounds, such as vinyl esters, polyesters, acrylates and methacrylates, compounds carrying allyl groups, etc.

The inventive polymerizable and copolymerizable compounds are used preferably in conjunction with resins or backbone polymers, which have at least one ethylenically unsaturated double bond in the molecule. Since such backbone polymers predominantly are viscous to hard, brittle resins, they must be brought into a form suitable for application with an appropriate viscosity and reactivity by mixing them with an unsaturated solvent (reactive diluent). This task can be assumed by the liquid, unsaturated compound of this invention, because, aside from the advantages described above, they also have good compatibility and solubility parameters towards such backbone polymers.

Some compounds of the invention are viscous, semisolid or solid products. These hardenable, polymerizable and copolymerizable compounds can either be brought into a form suitable for application by mixing them with less viscous products or processed as a reactive borehole-filling mass.

As backbone polymers, those unsaturated polyester resins are particularly suitable, which have ester groups within the molecular chain as well as in the side groups. The polyesters, in which the ester group is an element within the molecular chain, include those polycondensates, which still have double bonds in the main chain of the molecule and are prepared from dicarboxylic acids and polyalcohols. Examples of the dicarboxylic acids are maleic acid, fumaric acid, phthalic acid, isophthalic acid, citraconic acid, mesaconic acid, sebacic acid, trimellitic acid and dimeric fatty acids.

However, this group also includes phenol acid resins, such as those from 4,4-bis(4-hydroxyphenyl) valeric acid and also those unsaturated polyester resins with an epoxide resin-like structure.

Numerous compounds come into consideration as polyalcohols. Of these, glycols, such as ethylene glycol, propylene glycol and butylene glycol occupy a place of special importance. Such compounds as cyclohexanediol, bisphenol A, bisphenol F, dialkyl maleate, neopentylglycol, etc. are furthermore suitable as polyols.

The polyesters, which have the ester group in the side chain, include the polyacrylates and the polymethacrylates.

Particularly suitable are those unsaturated polyesters, which were obtained by the reaction of compounds carrying epoxide groups with unsaturated carboxylic acids. Such backbone polymers are more resistant to water and saponification and, at the same time, have lower shrinkage values, if for no other reason than that the content of ester groups is relatively low in comparison with conventional polyesters. These unsaturated polyesters are also referred to as epoxide acrylates and epoxide methacrylates in expert circles, because they are preferably synthesized by the reaction of epoxides with acrylic acid and methacrylic acid. Crotonic acid is also suitable for this purpose.

Backbone polymers, which are particularly suitable in conjunction with the inventive, polymerizable and copolymerizable compounds, are those acrylic functionalized and methacrylic functionalized epoxide resins, which are synthesized on the basis of bisphenol A and/or F novolaks. These basic epoxides, which are functionalized with unsaturated carboxylic acids, correspond to the general formulas:

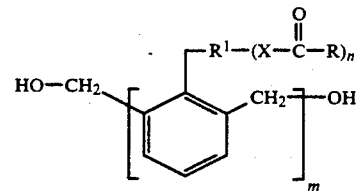

wherein R, R$^1$ and X have the meaning given and n=1 to 5 and m=2 to 50,

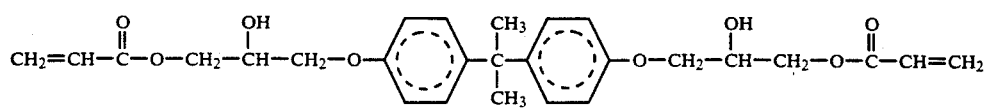

and

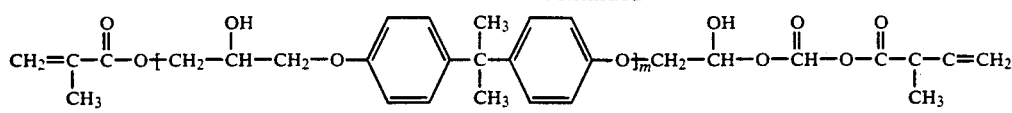

The hardenable, polymerizable and copolymerizable cycloaliphatic compounds, contained pursuant to the invention in the borehole-filling mass, are generally contained in amounts of 5 to 95% by weight, preferably in amounts of 10 to 60% by weight and particularly in amounts of 30 to 50% by weight. If these inventive, hardenable, polymerizable and copolymerizable compounds are used for the copolymerization of reactive borehole-filling masses together with one or several of the above or other backbone polymers, the mixing ratios by weight are between 20:1 and 1:20 and preferably between 10:1 and 1:10. These mixing ratios are determined primarily by the rheological properties of the backbone polymer and of the application conditions of the reactive borehole-filling masses. In addition, other polymerizable compounds may also be contained. The above-mentioned dual curing functionality in the compounds carrying allyl groups is retained even if these compounds are present in relatively low concentrations.

The polymerization, which is required for the hardening, can take place strictly as a homopolymerization of an unsaturated carboxylic acid ester derivative containing the cycloaliphatic groups and also by copolymerization of a mixture of such derivatives. Highly preferred, however, is the copolymerization of one or more of such derivatives with oligomeric and/or polymeric compounds or backbone polymers, which contain unsaturated carboxylic acid groups. These include preferably the above, unsaturated polyester resins, particularly the epoxide acrylates.

The polymerization or copolymerization, which is required for the hardening, takes place due to the addition of or homogeneous mixing with reaction initiators require for systems of this type. These include, amongst others, methyl ethyl ketone peroxides, cyclohexane peroxides, dibenzoyl peroxide, p-chlorobenzoyl peroxide, acetylacetone peroxide, cumol hydroperoxide and other polymerization initiators. However, high-energy radiation, such as UV radiation in the presence of a photoinitiator or electron beams can also start the polymerization and copolymerization.

Moreover, the polymerization or copolymerization after addition of one or more reaction initiators can be accelerated by the addition of an accelerator, in order to be able to carry it out also at lower temperatures. For this purpose, accelerators, including those based on heavy metal salts, such as cobalt acetylacetonate and vanadium naphthenate, tertiary amines such as diethylaniline and dimethyl-p-toluidine, are suitable, for the dual curing with the compounds carrying allyl groups, the presence of metal catalysts, such as drying agents or siccatives is indicated, because they assume, aside from their catalytic initiation of the autoxidation reaction, additionally also the function of an accelerator in polymerizing systems. The reaction initiators and accelerators are used, in general, in amounts of 1 to 10% by weight and preferably in amounts of between 1 and 5% by weight, based on the ready-for-use borehole-filling mass. The borehole-filling masses, composed according to the inventive use, can be produced as 2-chamber systems, the one chamber containing the reaction initiators and the other the polymerizable compounds. These borehole-filling masses can also be produced as one-component systems, in which case the reaction initiators or reaction accelerators or both are used in a microencapsulated form.

The inventive, curable compositions can be modified by further additives. Suitable additives are, for example, plasticizers, oils, tars, asphalts, bitumens, dyes, pigments, thixotropizing agents, inorganic and/or organic fillers and fibers. Moreover, stabilizers and/or inhibitors can be added to them.

Of importance in borehole-filling masses are the inorganic and/or organic fillers. Quartz powders and sands, corundums and pulverized rock are particularly suitable as inorganic fillers. Moreover, hollow micro particles of silicates, corundums, etc. can be used. Organic fillers are, for instance, flowers or hollow micro particles of duromers, such as phenol-aldehyde resins.

Such materials as pyrogenic silicas and bentonites are suitable for thixotropizing these inventive, reactive borehole-filling masses.

The fillers, hollow micro-particles, thixotropizing agents and/or microcapsules, used in the inventive, reactive borehole-filling masses, can additionally be coated with materials, such as silanes and chromium complexes, which form adhesive bridges, in order, for instances, to attain bonds, which are reinforced at the interfaces. They may also, however, be coated with materials such as fatty acids and fatty esters, to prevent chemisorption.

The reactive borehole-filling masses with the inventive, hardenable, polymerizable and copolymerizable compounds can be used in all areas of fastening technique, particularly in construction, underground civil engineering and mining and in machinery and equipment construction.

The inventive, curable borehole-filling masses, packaged in tubes, cartridges, cans, hobbocks, etc., have a shelf life of several months. Before use, they are mixed homogeneously with the reaction initiators. In the case of pre-proportioned packages, such as glass or plastic cartridges as 2-chamber systems or in the case of microencapsulated systems, mixing and activating take place, for example, only in the borehole.

The invention is described in greater detail in the following examples, it being understood, however, that these examples are given by way of illustration and not by way of limitation.

EXAMPLE 1 TO 15

The compositions of the inventive, reactive borehole-filling masses are summarized in Table 1.

The borehole-filling masses are prepared in a planetary mixer in such a manner that, if necessary, to begin with, the backbone polymer is dissolved in or diluted with one or several of the inventive, cycloaliphatic, unsaturated carboxylic acid derivatives and, subsequently, the accelerators, diethylaniline, dimethyl-p-toluidine and/or cobalt octoate, are added and mixed in homogeneously. Into the pre-accelerated basic mixture, plasticizers and the pyrogenic silica (thixotropizing agent) are then optionally incorporated. In addition, a dissolver can be used to disintegrate the pyrogenic silica. Finally, the fillers, quartz powders and sands, corundum and diatomaceous earth are incorporated and stirred in the planetary mixer, until a homogeneous mixture is achieved. The borehole-filling masses are then degassed and filled into packing containers.

The molecular weights of the backbone polymers used are:

| | |
|---|---|
| bisphenol A methacrylate | 492 to 775 |
| novolak epoxide acrylate (bisphenol F, difunctional) | 780 to 1,200 |
| di-(methylacroylmaleoyl)-tricyclo-5.2.1.0$^{2.6}$-decane | 709 |

The plasticizers used were dioctyl phthalate and di-2-ethylhexyl phthalate.

The borehole-filling masses of examples 1 to 15 are products, which can be metered out and are intended, for instance, for solid substrates such as concrete, solid brick, rock, etc.

EXAMPLE 16

A shear connector cartridge of the M12 size was prepared as follows:

a) Outer Cartridge

The glass cartridge used for this purpose had the following characteristics:

| | |
|---|---|
| glass weight: | 5.6 g |
| external diameter of glass: | 10.75 mm |
| glass wall thickness | 0.55 mm |
| cartridge length: | 110 mm |

The inner cartridge, described below, was placed in this outer cartridge and the remaining space filled with
3.0 g of bisphenol A methacrylate, pre-accelerated with amine
1.3 g of dicyclopentenyloxyethyl methacrylate
6.6 g of quartz sand, 1.5 to 2.0 mm.

b) Inner Cartridge

The glass cartridge had the following characteristics

| | |
|---|---|
| glass weight: | 1.2 g |
| external diameter of glass: | 6.3 mm |
| glass wall thickness: | 0.65 mm |
| cartridge length: | 80 mm |

This inner tube was filled with dibenzoyl peroxide, 20%, stabilized with chalk.

EXAMPLE 17

A solid, unsaturated polyester resin[3] (34.5 parts by weight) was dissolved in 28.0 parts by weight of dicyclopentenyloxyethyl methacrylate in a planetary mixer and pre-accelerated with 1.2 parts by weight of diethylamine. Subsequently, 4.2 parts by weight of dioctyl phthalate and 4.0 parts by weight of pyrogenic silica (with a specific surface area of about 200 m$^2$/g) were incorporated with a dissolver (3,500 r.p.m.). Into this homogeneous mass, 28.1 parts by weight of hollow micro-particles of silicate (0.02 to 0.15 mm) were stirred with the planetary mixer (120 r.p.m.). Finally, 2.2 parts by weight of dibenzoyl peroxide paste (50% in plasticizer) were mixed in.

[3]The unsaturated polyester resin consists of: 35% phthalic anhydride, 24% maleic anhydride 26% diethylene glycol and 15% ethylene glycol The composition has the following characteristics:

| | |
|---|---|
| gel time (t$_{gel}$): | 5 to 8 minutes |
| viscosity: | 260 ± 30 Pa × sec |
| liquid limit: | 950 ± 50 Pa × sec |
| density: | 9.85 g/cc (sic!!!) |

This borehole-filling mass, which can be metered out, is particularly suitable for cavity walls.

EXAMPLE 18

Siloxane dimethacrylate (25 parts by weight with a molecular weight of 1,200) was mixed at a temperature of +50° C. in the planetary mixer with 25 parts by weight of di-(methylacryloyl-maleoyl)-tricyclo-5.2.1.0$^{2.6}$-decane and 1.8 parts by weight of cobalt octoate (6% cobalt) until a homogeneous mixture was obtained. Subsequently, 4.2 parts by weight of pyrogenic silica (with a specific surface are of 200 m$^2$/g) were added and incorporated with a dissolver (3,500 r.p.m.). Following this, 44 parts by weight of hollow micro-particles of silicate (0.1 to 0.7 mm) were added. Finally, 4.2 parts by weight of cumoyl hydroperoxide, 80% in cumol, were added and mixed in homogeneously.

The composition had the following characteristics:

| | |
|---|---|
| gel time (t$_{gel}$): | 10 to 15 minutes |
| viscosity: | 210 ± 20 Pa × sec |
| liquid limit: | 900 to 950 Pa × sec |
| density: | 0.98 g/cc |

EXAMPLE 19

The following pre-accelerated 1-component borehole-filling mass was prepared in a planetary mixer:

| | |
|---|---|
| 60 parts by weight | novolak epoxide acrylate, bisphenol F-type, preaccelerated with microencapsulated cobalt acetylacetone |
| 40 parts by weight | dicyclopentenylethyl methacrylate |
| 1 part by weight | pyrogenic silica (200 m$^2$/g) |
| 2 parts by weight | zinc oxide |
| 1 part by weight | magnesium oxide |
| 40 parts by weight | hollow micro-particles of magnesium calcium silicate with a particle size of 0.3 mm |
| 1 part by weight | methacrylic acid |
| 15 parts by weight | microencapsulated cumol hydroperoxide, 50% in cumol, with a particle size of 0.1 mm |
| 2 parts by weight | microencapsulated cobalt acetylacetonate |
| 38 parts by weight | quartz sand, coated with vinylsilane, with a particle size of 0.1 to 0.25 mm |

The 1-component borehole-filling mass was filled into polyethylene cartridges and was ready for use.

EXAMPLE 20

Example 19 was repeated. However, dibenzoyl peroxide microcapsules and, as accelerators, microencapsulated diethylaniline and microencapsulated dimethyl-p-toluidine were used instead of cumol hydroperoxide microcapsules in the same proportions by weight.

The inventive, reactive borehole-filling masses of Examples 1 to 20 were tested for their curing, pull-out values and bond strengths. The following values were obtained:

Concrete, cavity walls, rock and solid brick were chosen as building materials. The concrete used corresponded to the qualities B15, B25, B35 and B45. The B35 concrete used had the following values:

B35—actual strength = 48 N/mm²

The threaded rods used corresponded to M12, 5.8 and M12, 12.9, high strength.
The boreholes had the following characteristics:

| | |
|---|---|
| depth: | 110 mm |
| diameter for 2-component composition: | 14 mm |
| diameter for 1-component composition with micro-encapsulated hardener systems: | 12.8 mm |

The test data obtained are average values of 5 tests and summarized in Table 2.

TABLE 1

| Raw Materials | Borehole-Filling Mass - Composition No. (Parts by Weight) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Bisphenol A methacrylate | 22.2 | — | 7.63 | 21.3 | — | — | — | — | — | — | 22.2 | — | 10.0 | — | — |
| Novolak epoxide acrylate | — | 34.5 | 9.85 | — | — | — | — | — | 27.0 | 14.5 | — | 30.5 | 10.0 | — | — |
| Di-(methylacryloyl-maleo-yl)-tricyclo-5.2.1.0.$^{2,6}$-decane | — | — | — | 5.8 | — | 20.5 | 20.5 | 20.5 | — | 11.0 | — | — | 8.0 | — | — |
| Dicyclopentenyloxyethyl methacrylate | 13.2 | 28.0 | 16.14 | 10.0 | 48.2 | — | — | — | — | — | — | — | — | — | — |
| Dicyclopentenyloxyethyl crotonate | — | — | — | — | — | 16.5 | — | — | — | — | — | 10.5 | — | 45.0 | — |
| 3-Methacryloyl-oxymethyl-tricyclo-5.2.1.0$^{2,6}$-decane | — | — | — | — | — | — | 14.5 | — | — | — | — | — | — | — | — |
| 3-Methacryloylglycolicacid 2-ylester | — | — | — | — | — | — | — | 17.0 | — | — | — | — | — | — | — |
| Dimethacryloxymethyl-tricyclododecane | — | — | — | — | — | — | — | — | — | — | — | 13.2 | — | — | 38.0 |
| Dihydrodicyclopentadienyl methacrylate | — | — | — | — | — | — | — | — | — | — | — | — | 12.0 | — | — |
| Isobornyl methacrylate | — | — | — | — | — | — | — | — | — | 15.0 | — | — | — | — | — |
| Decalyl-2-methacrylate | — | — | — | — | — | — | — | 13.0 | — | — | — | — | — | — | — |
| Quartz powder 0–0.063 mm | — | 27.1 | 14.0 | — | — | 23.0 | — | — | — | — | — | 10.5 | — | 14.5 | 18.0 |
| Quartz sand, 0.1–0.25 mm | 30.0 | — | 46.96 | 52.46 | 23.0 | 20.8 | — | 21.2 | — | — | 30.0 | 20.0 | 26.9 | 14.6 | 22.0 |
| Quartz sand, 0.3–0.65 mm | 30.1 | — | — | — | — | — | — | 30.6 | 45.0 | — | 30.1 | 19.1 | 20.0 | 14.5 | — |
| Quartz sand, 1.5–2.0 mm | — | — | — | — | — | — | — | — | — | 49.7 | — | — | — | — | — |
| Al corundum, 1–2 mm | — | — | — | — | — | — | 56.55 | — | 10.0 | — | — | — | — | — | — |
| Silica, pyrogenic | — | 4.0 | 0.66 | 2.66 | 0.55 | 3.2 | 4.2 | 4.5 | 3.5 | 2.8 | — | 3.4 | 2.8 | 5.0 | 4.3 |
| Diatomaceous earth | — | — | — | — | 22.0 | 10.0 | — | — | — | — | — | — | — | — | 11.7 |
| Dibenzoyl peroxide, 20% in chalk | — | — | — | — | — | — | — | — | — | — | — | — | 6.0 | — | — |
| Dibenzoyl peroxide, 50% in plasticizer | 4.45 | 2.2 | 4.52 | 3.7 | 2.93 | — | — | — | — | — | 4.45 | — | — | — | — |
| Cumol hydroperoxide, 80% | — | — | — | — | — | 4.8 | 3.5 | 4.2 | 4.5 | 4.9 | — | 4.2 | 3.0 | 4.8 | 4.1 |
| Diethylaniline | — | — | 0.04 | 0.16 | 0.32 | — | — | — | — | — | — | — | 0.5 | — | — |
| Dimethyl-p-toluidine | 0.05 | — | — | — | — | — | — | — | — | — | 0.05 | — | 0.05 | — | — |
| Plasticizer | — | 4.2 | 0.2 | 3.92 | 3.00 | — | — | — | — | — | — | — | — | — | — |
| Cobalt octoate, 6% Co | — | — | — | — | — | 1.2 | 0.75 | 2.0 | 2.0 | 2.1 | — | 1.8 | 0.75 | 1.6 | 1.9 |

TABLE 2

| Borehole-Filling Mass. Example No. | Gel Time Minutes | Curing Time Minutes | Test Values | | Comments |
|---|---|---|---|---|---|
| | | | Pull-Out Value - kN | Bond Strength N/mm² | |
| 1 | 3–4 | 35 | 74 | — | concrete B35, anchor rod 8.8 |
| 2 | 5–7 | 35 | 80 | — | concrete B35, anchor rod 12.9, high strength |
| 3 | 6–7 | 30 | 5.8 | — | hollow perforated brick 6 (Poroton) |
| | | | 14.5 | — | chalky sandstone (KSL 12) |
| 4 | 60 | 480 | 34.5 | — | concrete B15 anchor rod 5.8 |
| | | | 48.9 | — | concrete B45 anchor rod 5.8 |
| 5 | 4 | 25 | 97.4 | — | concrete B25, slightly reinforced (1") |
| 6 | 3 | 20 | 24.5 | — | brick (actual strength = 40 N/mm²) |
| 7 | 6–7 | 35 | 52.3 | — | concrete B35, anchor rod 5.8 |
| 8 | 5 | 25 | 40.8 | — | concrete B35, anchor rod 5.8 |
| 9 | 4–6 | 25 | 55.2 | — | concrete B35, anchor rod 5.8 |
| 10 | 3 | 20 | 52.7 | — | concrete B35, anchor rod 5.8 |
| 11 | 5 | 25 | 50.1 | — | concrete B35, anchor rod 5.8 |
| 12 | 6 | 30 | 50.9 | — | concrete B35, anchor rod 5.8 |
| 13 | 4 | 25 | 49.3 | — | concrete B35, anchor rod 5.8 |
| 14 | 5 | 30 | 44.6 | — | concrete B35, anchor rod 5.8 |
| 15 | 4–5 | 30 | 39.4 | — | concrete B35, anchor rod 5.8 |
| 16 | 4–5 | 30 | 71.0 | $\geq 12$ | concrete B35, anchor rod 12.9 high strength |
| 17 | 8 | 40 | 51 | — | hollow perforated brick (Poroton) |
| 18 | 7 | 35 | 45.3 | — | concrete B35, anchor rod 5.8 |
| 19 | 2–3 | 25 | 68 | $\geq 14$ | concrete B35, anchor rod 8.8 |
| 20 | 1–2 | 20 | 72 | $\geq 10$ | concrete B35, anchor rod 8.8 |

We claim:

1. In a borehole-filling mass comprising a composition for setting the mass as anchoring means in a cavity of receiving material and filler useful for said mass selected from quartz powder and sand, corundum, pulverized rock, hollow microparticles of silicates and corundums, and flowers and hallow microparticles of phenol-aldehyde resin, the improvement comprising the presence of said composition in an amount of about 5 to 95% by weight of the borehole filing mass, wherein the composition comprises (a) a first component which is a cycloaliphatic compound substituted by at least one ethylenically unsaturated group, which compound is curable by polymerization and is present in an amount effective to cause the anchoring means to set upon hardening and (b) a second component selected from the group consisting of an unsaturated polyester and a vinyl ester, wherein the amount of (a) to (b) is about 20:1 to about 1:20, the composition is hardenable by combination with a reaction initiator and the cycloaliphatic compound contains a cycloaliphatic member selected from the group consisting of

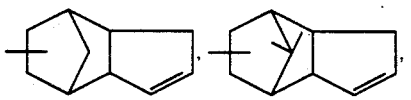

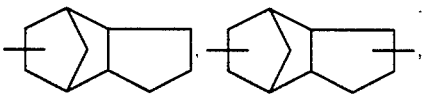

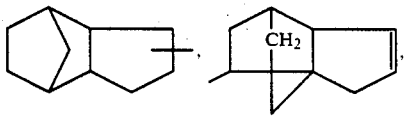

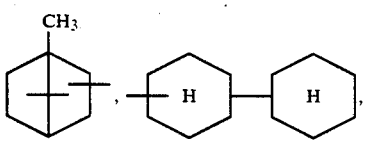

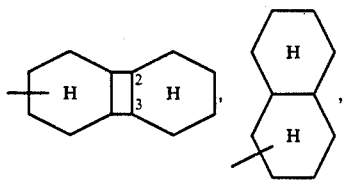

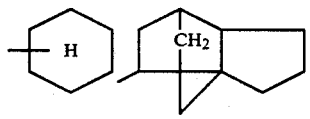

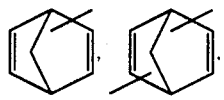

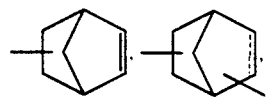

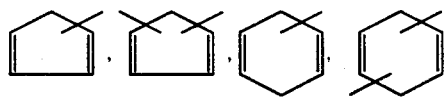

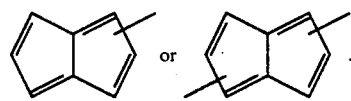 or

2. The borehole filing mass of claim 1, wherein said compound has the formula

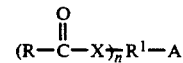

wherein
A is said cycloaliphatic member,
R is a hydrocarbon group of an ethylenically unsaturated carboxylic acid, which is optionally substituted by hydroxy, nitrile, halogen and/or $C_1$-$C_4$ alkyl,
X is —O—, —N($R^2$)—, —NH—C(O)— and/or
the R—C(O)—X— group represents an ethylenically unsaturated dicarboxylic acid imide group,
$R^1$ is a saturated or unsaturated hydrocarbon group, which is optionally substituted with hydroxy, repeatedly with R—C(O)—X—, with amino, $C_1$-$C_8$ alkyl, $C_1$-$C_8$ alkoxy and/or oxyalkyl and optionally has —C(O)—O—, —O—C(O)—O—, —O—C(O)—, —O—, —C(O)—, —NH—C(O)—NH—, —$NR^2$— and/or —NH—C(O)— bridging elements,
$R^2$ can be H, R—C(O)—, —$R^1$—A and/or $C_1$-$C_4$ alkyl and
n is 1 to 5.

3. The borehole filing mass of claim 2, wherein —X—$R^1$— is selected from

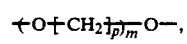

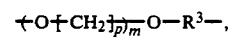

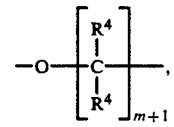

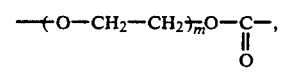

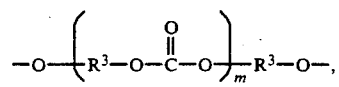

-continued

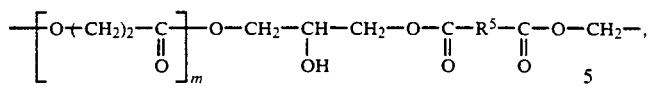

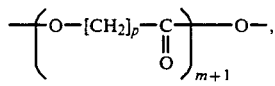

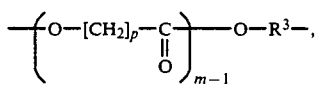

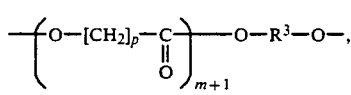

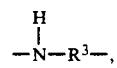

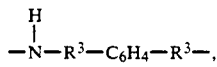

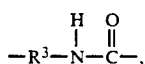

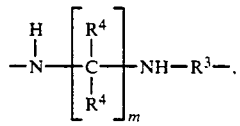

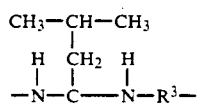

and

wherein,
  $R^3$ are the same or different and can be branched and unbranched as well as cyclic alkylene groups with 1 to 50 carbon atoms, arylene groups, aralkylene groups and/or acyl groups with 1 to 20 carbon atoms,
  $R^4$ is, H, Cl, CN, OH, $C_1$-$C_4$ alkyl,
  $R^5$ is —CH=CH—, —CH₂—CH₂,

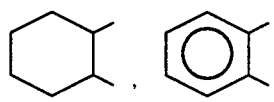

m is 0 to 50 and
p is 1 to 20.

4. The borehole filing mass of claim 1, wherein said compound has the formula

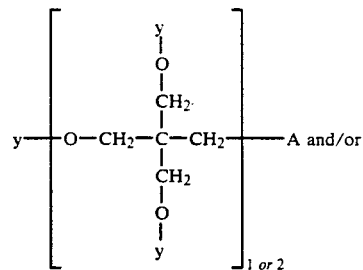

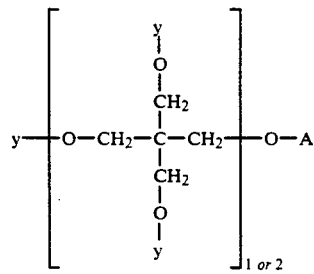

wherein A is said member, y is R—CO— and/or A, with the proviso that at least one of the y groups is R—CO— and A and R have the above meanings.

5. The borehole filing mass of claim 4, wherein the cycloaliphatic group contains an allyl group.

6. The borehole filing mass of claim 2, wherein the $R^1$ group is an at least divalent, optionally substituted aliphatic polyol group with 2 to 6 carbon atoms, the divalent group of an aliphatic oxycarboxylic acid with 2 to 18 carbon atoms or the divalent group of $C_2$-$C_6$ polyol esters or a $C_6$-$C_{80}$ polyalkylene glycol ester of a carboxylic acid.

7. The borehole filing mass of claim 2, wherein the cycloaliphatic compound is

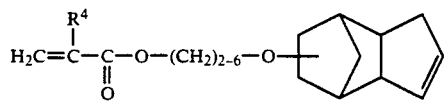

wherein $R^1$ has the above meaning.

8. The borehole filing mass of claim 2, wherein the cycloaliphatic compound is

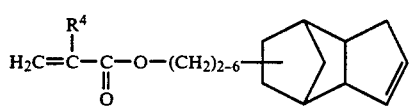

wherein $R^1$ has the above meaning.

9. The borehole filing mass of claim 1, wherein acrylic functionalized and/or methacrylic functionalized epoxide resins (epoxide acrylates), are contained in the composition as additional polyesters.

10. The borehole-filling mass of claim 1, in which the composition is present in an amount of about 30 to 50% by weight of the mass.

11. The borehole-filling mass of claim 1, which contains at least one additional component selected from accelerator, plasticizer and thixotropic agent.

12. The borehole-filling mass of claim 1, which is contained in a two-compartment cartridge, the borehole filling mass being in one compartment and a reaction initiator in the other compartment.

13. The borehole-filling mass of claim 1, which further comprises microencapsulated reaction initiator and microencapsulated accelerator.

14. The borehole-filling mass of claim 1, in which said cycloaliphatic compound has the formula $$(R-X)_n R^1-A$$

wherein
- A is said cycloaliphatic member
- R is an allyl or vinyl group,
- X is $-O-$, $-N(R^2)-$ or $NH-C(O)$,
- $R^1$ is a saturated or unsaturated hydrocarbon group, optionally substituted with hydroxy, $R-C(O)X$, amino, $C_1-C_8$ alkyl, $C_1-C_8$ alkoxy and/or oxyalkyl and
- n is 1 to 5.

15. The borehole-filling mass of claim 1, in which said cycloaliphatic member is selected from the group consisting of tricyclodecane, dicyclopentenyl, tricyclododecane, dihydrodicyclopentadienyl, isobornyl and decalyl.

16. The borehole-filling mass of claim 2, in which
R is selected from at least one member of the group consisting of acrylic, methacrylic or crotonic acid and
$R^1$ is an aliphatic hydrocarbon group.

17. The borehole-filling mass of claim 2, in which the $R-C(O)-X$ group is the maleic acid imide group.

18. The borehole-filling mass of claim 3, in which $R^3$ is a cyclic alkylene group of 1 to 20 carbon atoms.

19. The borehole-filling mass of claim 9, in which acrylic functionalized and/or methacrylic functionalized epoxide resin based on bisphenol A, F and/or novolaks are present in the composition as polyesters.

* * * * *